United States Patent [19]

Money, Sr.

[11] 4,032,181
[45] June 28, 1977

[54] BATTERY CARRIER

[76] Inventor: George G. Money, Sr., R.D. No. 2 - Box 245, Smyrna, Del. 19977

[22] Filed: Jan. 29, 1976

[21] Appl. No.: 653,298

[52] U.S. Cl. .............................. 294/16; 294/31 R; 294/63 B

[51] Int. Cl.² ......................................... B65G 7/12

[58] Field of Search .............. 294/16, 63 B, 28, 31, 294/62, 63 R, 103, 114, 106, 118, 92; 224/45 F, 45 D, 45 P; 16/114 R; 136/1, 181, 161

[56] References Cited

UNITED STATES PATENTS

| 1,488,455 | 3/1924 | Chase | 294/31 R |
| 1,644,905 | 10/1927 | Whiteside | 294/31 R |
| 1,779,291 | 10/1930 | Richardson | 294/63 B |
| 2,629,177 | 2/1953 | Zinken | 294/62 |
| 3,820,837 | 6/1974 | Fredrickson | 294/63 B |

*Primary Examiner*—James B. Marbert
*Attorney, Agent, or Firm*—Smith, Harding, Earley & Follmer

[57] ABSTRACT

An automobile storage battery carrier adapted to engage the sides of the battery for lifting, tilting or maneuvering the same into and out of an operating position in the automobile including an elongated member having a handle portion and a leg portion. The handle portion extends at right angles to a leg portion which is provided with a hook on the end thereof for engaging the side of the battery. An arm is pivotally mounted at an end on the leg portion to extend beneath the handle portion. The pivoted arm is provided with a hook formed on its end for engaging the side of the battery opposite the side engaged by the hook on the leg portion of the elongated member. The leg portion of the elongated member is also provided with a stop which is spaced from the hook portion formed thereon for contacting the top of the battery to be carried.

8 Claims, 3 Drawing Figures

BATTERY CARRIER

BACKGROUND OF THE INVENTION

This invention relates generally to carriers for automobile storage batteries and particularly to battery carriers for use in lifting, tilting or maneuvering the battery into and out of its operating position in the automobile.

One form of battery carrier of the indicated type includes a pair of members which engage the battery at its terminal posts. Illustrative of this form of battery carrier are the devices shown in U.S. Pat. Nos. 1,935,828; 2,433,549; 3,059,953; and 3,572,806. Battery carriers of this type have the disadvantage that it is not possible to maneuver the battery very well or to tilt it relative to the vertical. Also, there is the danger with this type of carrier that a terminal post may break as the battery is being supported on the carrier which could cause serious injury to the user.

Another form of battery carrier of the prior art is the type in which the vertical walls of the battery are engaged to lift the same. Illustrative of such devices are those shown in U.S. Pat. Nos. 1,779,291; 2,778,668; and 3,820,837. However, these devices are limited in the maneuverability and tilting of the battery during an installation procedure.

SUMMARY OF THE INVENTION

It is the general object of the invention to provide a battery carrier which is adapted to engage the sides of a battery for lifting, tilting or maneuvering the battery into and out of an operating position in a vehicle. The battery carrier in accordance with the invention is designed to provide excellent maneuverability and permits the tilting of the battery to a wide range of angles relative to the vertical.

The battery carrier in accordance with the invention is designed to operate across the width of the battery to engage the side walls thereof. This has the advantage that most batteries are of a relatively standard width and can be carried by the device in accordance with the invention, whereas the length of the batteries varies over a substantial range.

Also, the design in accordance with the invention incorporates a minimum number of parts of simple construction and design to thereby minimize the cost of the battery carrier.

Another feature of the battery carrier in accordance with the invention is that it is provided with spring means which functions to maintain the carrier in position on the battery in a manner such that it is ready to be lifted when desired. The spring maintains a pivoted arm biased against the side of the battery to maintain the battery carrier under a spring biased engaging condition.

Another feature of the battery carrier in accordance with the invention is that it involves a design encompassing the utmost safety. For example, the design involves sturdy parts and uses two bolts for supporting the pivoted end of the arm so that if one bolt should fail, the other one serves as a backup to prevent breakage of the battery carrier.

Another feature of the battery carrier in accordance with the invention is that it is designed to be used to install and remove batteries and transport them without any need to contact the battery by the hands of the person using the carrier. This advantage results from the design which permits the battery to be tipped at any angle during the installation and removal procedure.

Briefly stated, the battery carrier in accordance with the invention comprises an elongated member having a handle portion adapted to extend across the top of the battery and a leg portion extending at right angles to the handle portion so as to extend to a position along the side of the battery to be carried. A hook is formed on the end of the leg portion for engaging the side of the battery. Pivotally mounted at one end of the leg portion is an arm which is mounted to extend beneath the handle portion and is provided with a hook on its extended end for engaging the side of the battery opposite the side engaged by the hook on the leg portion of the elongated member. A stop is formed on the leg portion of the elongated member at a location spaced from the hook portion formed thereon for contacting the top of the battery to be carried to limit the rotating movement thereof relative to the points of engagement of the hooks on the sides of the battery.

DETAILED DESCRIPTION OF THE PREFERRED EMBODIMENT

The dimensions and relative positions of the parts of the battery carrier in accordance with the invention may vary somewhat for accommodating various size batteries. The battery carrier shown and described herein is dimensioned for a conventional size battery which has a width of about 6¾ inches and weighs from about 40 to 53 pounds. The battery carrier in accordance with the invention is designed to operate across the width of the battery, this width being a relatively standard dimension.

Figure 1:
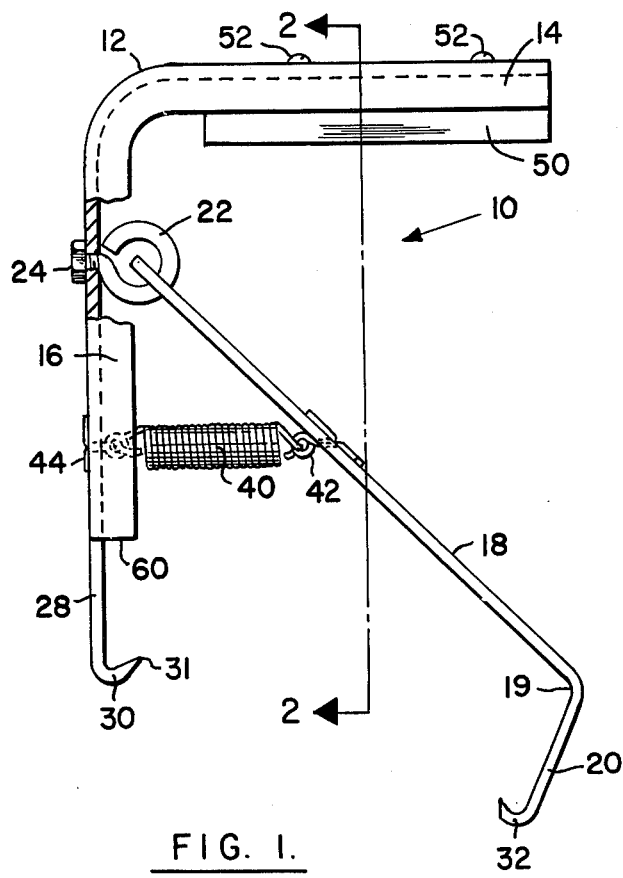
FIG. 1 is a side elevation of the battery carrier in accordance with the invention.
Figure 2:
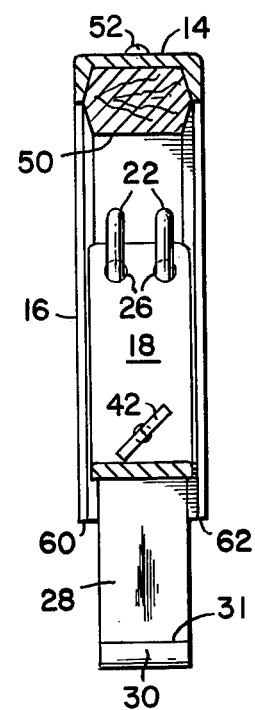
FIG. 2 is a section taken on line 2—2 of FIG. 1.
Figure 3:
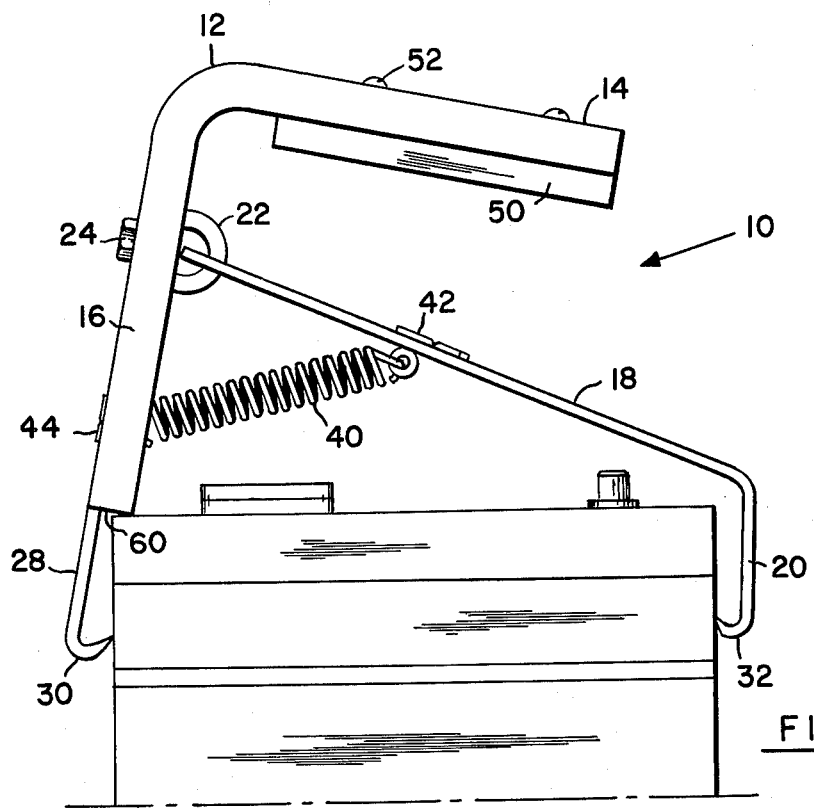
FIG. 3 is a view of the battery carrier as it is positioned to engage a battery to be carried.

FIG. 1 shows a battery carrier 10 in accordance with the invention in its normal condition prior to being engaged with a battery to be carried. The battery carrier 10 comprises an elongated member 12 made of a steel channel having a U-shaped cross-section and being bent into a right angular configuration. The member 12 comprises a handle portion 14 adapted to extend across the top of the battery to be carried and a leg portion 16 extending at right angles to the handle portion so that it can be positioned along the side of the battery to be carried as is shown in FIG. 3.

The battery carrier 10 also comprises an elongated arm 18 pivotly mounted at one end on the leg portion 16 of member 12. The arm 18 is made of a flat strip of steel having a transverse bend 19 near one end thereof. In the pivotally mounted position of the arm 18 it extends from the pivotal mounting across the top of the battery and is provided with an end portion 20 below the bend 19 adapted to extend along the side of the battery as is shown in FIG. 3.

The pivotal mounting means for the arm 18 comprises a pair of eye bolts 22 which are secured in a fixed position to the base of the leg portion 16 by means of a pair of mounting nuts 24. The pivoted end of the arm 18 is provided with holes 26 which receive the eye portions of the bolts 22 in a manner to permit the pivotal movement of the arm 18.

An end portion 28 of the leg portion 16 is formed by an extension of the base portion of the channel member 12. A hook 30 is formed on the end portion 28 by a turned end thereof. This turned end is tapered to a sharp edge, provides an elongated edge 31 for engaging the side of the battery along a line end extends at an acute angle with the portion 28 immediately adjacent thereto to provide a good engaging action with the side of the battery to be carried.

A hook 32 is formed on the end portion 20 of the arm 18 and is similar to the hook 32 in that it is formed as a turned end, it is tapered to a sharp edge, provides an elongated edge for engaging the battery side along a line, and extends at an acute angle with the end portion 20.

Spring means are provided for biasing the arm 18 to a normal position in which the hooks 30 and 32 are spaced a distance less than the space between opposite sides of a conventional size battery. Such means comprises a tension spring 40 extending between cotter pins 42 and 44 secured in the arm 18 and in the base of leg portion 16, respectively. The tension spring 40 thus serves to bias the hooks 30 and 32 toward engagement with the opposite sides of a battery to be carried and requires that the arm 18 be moved against the bias of the spring 40 in order to engage the carrier with a conventional size battery. The normal position of the arm 18 relative to the leg portion 16 with the spring 40 in an untensioned condition is shown in FIG. 1. In this condition the hooks 32 and 34 are spaced a distance less than the width of a conventional size battery. When the battery carrier is assembled in engagement with a battery as is shown in FIG. 3, the arm 18 is pivoted upwardly towards the handle portion 14 to stretch the spring 40 to a tensional condition. Accordingly, the spring 40 will serve to maintain the carrier on top of a battery on which it has been installed unless positive steps are taken to remove the carrier from the battery as by pivoting the arm 18 from the position shown in FIG. 3 to clear the hooks 30 and 32 from engagement with the sides of the battery.

A handle bar 50, consisting of a piece of wood, is mounted on the underside of the handle portion 14 by means of mounting screws 52. The handle bar 50 provides a smoother grip for the hands of the user of the battery carrier.

The sides of the U-shaped channel of member 12 are terminated on leg portion 16 to form a pair of stops 60 and 62 which are spaced from the hook portion 32 by about 1¾ to 2 inches. The stops 60 and 62 are designed to contact the top of the battery to be carried at two spaced locations. The contact of the stops 60 and 62 with the top of the battery is illustrated in FIG. 3.

The dimensions of the various parts is such that when the battery carrier is placed in engagement with a battery, the shoulders 60 and 62 can be placed in tight contact with the top of the battery. To insure that this important function is achieved, the spacing between the shoulders 60 and 62 and the hook 30, the location of the pivot for the arm 18 and the length of the arm 18 from its pivot point to the hook 32 must be dimensioned such that the width of the battery for which the carrier is designed is greater than the distance between the hook 32 and the shoulders 60 and 62 when the carrier is engaged on the battery with the hooks 30 and 32 engaged on the opposite sides of the battery. As was stated above, this dimensional relationship insures that the shoulders 60 and 62 are positionable in contact with the top of the battery when the carrier is placed in the carrying position.

In using the battery carrier in accordance with the invention, the battery carrier is positioned onto a battery to be carried to a position as is illustrated in FIG. 3. This can be achieved by engaging the hook 32 with one side of the battery and then effecting a stretching of the spring to position the hook 30 against the other side of the battery. The carrier is then maneuvered to force the shoulders 60 and 62 into tight engagement with the top of the battery. When it is desired to move the battery, the user simply grasps the handle portion 14 and applies a lifting force. This lifting action will have the effect of increasing the contact between the hooks 30 and 32 and the sides of the battery by reason of the direction in which the forces are applied transversely to the sides of the battery because of the offset location of the pivot for the arm 18 and the fact that the arm 18 extends across the top of the battery. Accordingly, as the carrier is raised upwardly it will maintain a secure engagement with the battery which will move along with the carrier.

In addition to providing a secure lifting action, the battery carrier in accordance with the invention can be used to maneuver the battery to a tilted condition. This is achieved by reason of the tight engagement of the hooks 30 and 32 with the battery and by reason of the contact between the stops 60 and 62 with the top of the battery. Thus, any tendency for the battery to turn from the tight engaged position with the carrier as the carrier effects a tilting action is prevented by reason of the stops 60 and 62 contacting the top of the battery and restricting any rotating movement of the battery relative to the hooks 30 and 32. Accordingly, the battery carrier in accordance with the invention can be used to achieve a great amount of maneuverability in the handling of the battery. This can be quite important in installing and removing batteries from automobiles where the battery location is a relatively unaccessible position.

It will be noted that the battery carrier in accordance with the invention is made of a very inexpensive construction. The member 12 is formed of a single piece construction from which the stops 60 and 62, the hook 30, the leg 16 and the handle portion 14 are formed. Also the arm 18 is formed of a single piece construction which provides the pivoted end and the hook 32. Furthermore, the battery carrier in accordance with the invention provides a very sturdy and safe construction. In addition to being made of sturdy materials, the pivotal mounting means for the arm 18 comprises a pair of eye bolts 22 designed so that if one should fail, the other would be sufficient to retain the arm 18 in its engaging position.

It will be apparent that various changes may be made in the construction and arrangement of parts without departing from the scope of the invention as defined by the following claims.

I claim:

1. A battery carrier adapted to engage the sides of a battery for lifting, tilting or maneuvering the battery into and out of an operating position in a vehicle comprising: an elongated member having a handle portion adapted to extend across the top of a battery to be carried and a leg portion extending at an angle to said handle portion so as to be positioned along the side of a battery to be carried, a hook formed on the end of said leg portion for engaging the side of a battery to be carried, an elongated arm, means for pivotally mounting one end of said arm on said leg portion of said elongated member with said arm extending beneath said handle portion, a hook formed on the other end of said arm for engaging the side of a battery opposite the side engaged by said hook on said leg portion of said member, spring means extending between said arm and said leg portion for biasing said hooks toward engagement with opposite sides of a battery to be carried, said spring means biasing said arm to a normal position in which said hooks are spaced a distance less than the space between opposite sides of a conventional size battery whereby said arm must be moved against the bias of said spring means in order to engage the carrier with a conventional size battery, and a stop formed on said leg portion of said member and spaced from said hook formed thereon for contacting the top of a battery to be carried in the normal battery engaging position of said leg portion along the side of the battery to be carried, said stop having a substantial effective width and including stop surfaces for contacting the top of the battery to be carried at two spaced locations along the top of the side of the battery engaged by said hook on said leg portion, said member is formed of a bent channel of a U-shaped cross-section, the sides of said channel terminating at a location spaced from said hook formed thereon to form said stop surfaces, the base of said channel extending beyond said stop surfaces to form said hook.

2. A battery carrier according to claim 1 wherein each of said hooks is formed to provide an elongated edge for engaging the battery side along a line.

3. A battery carrier according to claim 2 wherein each of said hooks is formed by a turned end tapered to a sharp edge and extending at an acute angle with the portion immediately adjacent thereto.

4. A battery carrier according to claim 1 wherein said member is formed of a single piece provided with said stop and said hook thereof.

5. A battery carrier according to claim 4 wherein said arm is formed of a single piece provided with said hook thereof.

6. A battery carrier according to claim 1 wherein pivotal mounting means includes a pair of eyebolts secured onto said leg portion and engages in holes in said arm.

7. A battery carrier according to claim 1 wherein the spacing between said stop and said hook on said leg portion of said member, the location of said pivot for said arm and the length of said arm are dimensioned such that the width of the battery for which the carrier is designed is greater than the distance between said hook on said arm and said stop when the carrier is engaged with the battery with said hooks engaged on opposite sides of the battery whereby said stop is positionable in contact with the top of the battery.

8. A battery carrier adapted to engage the sides of a battery for lifting, tilting or maneuvering the battery into and out of an operating position in a vehicle comprising: an elongated member having a handle portion adapted to extend across the top of a battery to be carried and a leg portion extending at an angle to said handle portion so as to be positioned along the side of a battery to be carried, a hook formed on the end of said leg portion for engaging the side of a battery to be carried, an elongated arm, means for pivotally mounting one end of said arm on said leg portion of said elongated member with said arm extending beneath said handle portion, a hook formed on the other end of said arm for engaging the side of a battery opposite the side engaged by said hook on said leg portion of said member, spring means extending between said arm and said leg portion for biasing said hooks toward engagement with opposite sides of a battery to be carried, said spring means biasing said arm to a normal position in which said hooks are spaced a distance less than the space between opposite sides of a conventional size battery whereby said arm must be moved against the bias of said spring means in order to engage the carrier with a conventional size battery, and a stop formed on said leg portion of said member and spaced from said hook formed thereon for contacting the top of a battery to be carried in the normal battery engaging position of said leg portion along the side of the battery to be carried, each of said hooks is formed by a turned end tapered to a sharp edge for engaging the battery along a line, said member being formed of a single piece provided with said stop and said hook thereof, said arm being formed of a single piece with said hook thereof, said member being formed of a channel of a U-shaped cross-section, the sides of said channel terminating at a location spaced from said hook on said member to form said stop surfaces, the base of said channel extending beyond said stop surfaces to form said hook of said member, the spacing between said shoulder and said hook on said member, the location of said pivot for said arm and the length of said arm are dimensioned such that the width of the battery for which the carrier is designed is greater than the distance between said hook on said arm and said shoulder when the carrier is engaged with the battery with said hooks engaged on opposite sides of the battery whereby said shoulder is positionable in contact with the top of the battery.

* * * * *